United States Patent [19]

Behr

[11] 4,056,607
[45] Nov. 1, 1977

[54] THERMOCHEMICAL PROCESS FOR THE PRODUCTION OF HYDROGEN AND OXYGEN FROM WATER

[75] Inventor: Friedrich F. Behr, Gross-Denkte, Germany

[73] Assignee: Rheinische Braunkohlenwerke AG, Cologne, Germany

[21] Appl. No.: 756,728

[22] Filed: Jan. 4, 1977

[30] Foreign Application Priority Data

Jan. 9, 1976 Germany .............................. 2600666

[51] Int. Cl.² .......................... C01B 1/16; C01B 1/28; C01B 13/00
[52] U.S. Cl. ................. 423/579; 423/648 R; 423/652; 423/653
[58] Field of Search ................. 423/579, 648, 650-654

[56] References Cited

U.S. PATENT DOCUMENTS

| | | | |
|---|---|---|---|
| 3,932,599 | 1/1976 | Schulten et al. | 423/579 X |
| 3,984,530 | 10/1976 | Dreyfuss et al. | 423/650 |
| 3,995,016 | 11/1976 | Kittle | 423/579 |

FOREIGN PATENT DOCUMENTS 2,516,441  4/1975  Germany .............................. 423/648

OTHER PUBLICATIONS

Gregory, "A Hydrogen-Energy System", Aug. 1972, pp. III-42-III-68.
Wentorf et al., "Science", vol. 185, No. 4148, July 1974, pp. 311-319.
Funk, "9th Energy Conversion Engineering Conference, 1974 Proceedings", pp. 394-399.

Primary Examiner—Edward J. Meros
Attorney, Agent, or Firm—Connolly and Hutz

[57] ABSTRACT

In a thermochemical circulation process, hydrogen and oxygen are obtained from water wherein sulfuric acid and the paraffin hydrocarbon corresponding to the olefin used are formed from water, sulfur dioxide and a low-molecular weight olefin, particularly ethylene; the sulfuric acid is decomposed into water, sulfur dioxide and oxygen; the paraffin hydrocarbon is decomposed into the corresponding olefin and hydrogen; and after the removal of the hydrogen and oxygen, the remaining separation products are recycled into the first reaction.

5 Claims, 1 Drawing Figure

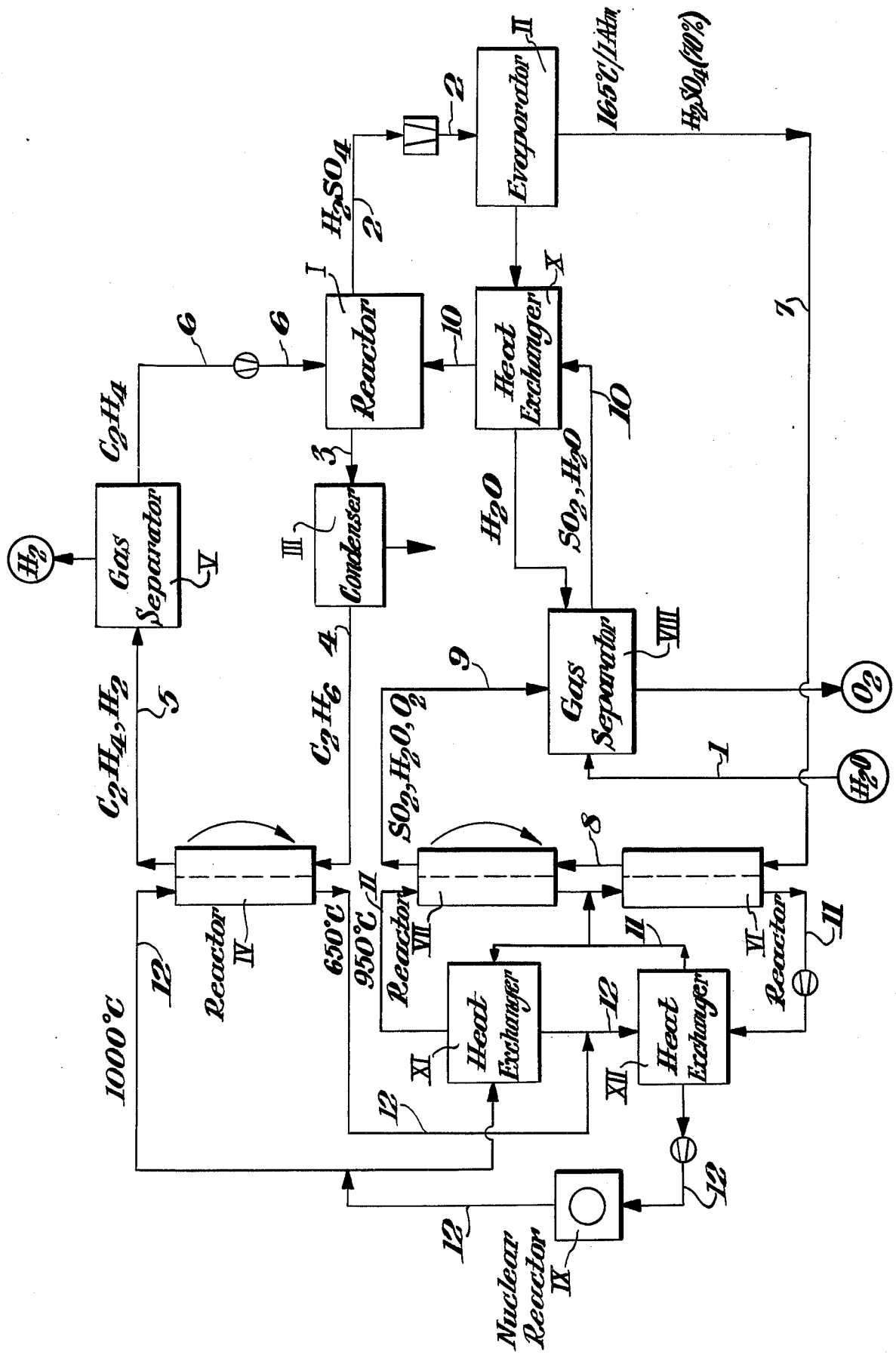

THERMOCHEMICAL PROCESS FOR THE PRODUCTION OF HYDROGEN AND OXYGEN FROM WATER

The invention relates to a multiple-stage thermochemical circulation process for the production of hydrogen and oxygen from water.

It is known that water may be decomposed into hydrogen and oxygen with the use of heat and circulating chemical compounds or constituents. This occurs, for example, in the multiple-stage processes of iron-chloride systems. In this connection, generally the heat resulting in a high-temperature nuclear reactor is utilized for covering the heat requirements. The primary drawbacks of the previously described processes consist of the difficulty of harnessing as fully as possible into the process the heat derived from the high-temperature nuclear reactor over the entire temperature range of about 1000° C to about 250° C, for one thing, and in the necessary transfer of large quantities of solids, for another.

The object of the invention, therefore, is to provide a multiple-stage circulating process for the thermochemical decomposition of water into hydrogen and oxygen utilizing almost uniformly the heat over the entire temperature range of about 1000°–250° C per temperature interval and allowing the entire heat to be harnessed together only in reactions which proceed in the liquid or the gas phase.

The fundamental object of the invention is accomplished by the steps of (1) reacting sulfur dioxide and water in the presence of catalytically acting quantities of iodine in an exothermic reaction at temperatures of about 200°–360° C and pressures of about 20–300 atmospheres with an olefin from the group of ethylene, propylene and butylene to produce sulfuric acid and the paraffin hydrocarbon corresponding to the olefin used; (2) catalytically or thermally decomposing the sulfuric acid into water, sulfur dioxide and oxygen after the most extensive possible concentration at temperatures of about 600°–950° C and removing the oxygen; (3) the paraffin hydrocarbon is dehydrogenated in a known manner at temperatures of about 500°–750° C catalytically or thermally with the re-formation of the corresponding olefin; and (4) the olefin obtained in such a manner as well as the sulfur dioxide, obtained from the sulfuric a acid, and water are recycled into the exothermic reaction and the hydrogen and oxygen are removed from the process.

The quantity of the iodine to be used preferably is about 1–10 moles $I_2$ per 100 moles olefin. Equilibrium reactions proceed then wherein the products are present either in a dissolved (d), gaseous (g), or fluid (fl) form:

| 1. | $I_2 + 2 H_2O + SO_2$ | $\rightleftarrows 2 HI + H_2SO_4$ |
| | (g)   (fl)   (g) | (d)   (fl) |
| 2. | HI | $\rightleftarrows$HI |
| | (d) | (g) |
| 3. | $HI + C_2H_4$ | $\rightleftarrows C_2H_5I$ |
| | (g)   (g) | (g) |
| 4. | $C_2H_5I + HI$ | $\rightleftarrows C_2H_6 + I_2$ |
| | (g)   (g) | (g)   (g) |
| 5.Σ | $C_2H_4 + 2 H_2O + SO_2$ | $\rightleftarrows H_2SO_4 + C_2H_6$ |
| | (g)   (fl)   (g) | (fl)   (g) |

This equilibrium may be shifted further to the right side by the use of an alkali sulfate with the formation of a hydrogen sulfate.

The speed-determining step is the reaction 4. It has been shown that it can be accelerated by the use of customary hydrogenation catalysts, e.g. platinum asbestos, palladium or nickel-containing catalysts or molecular sieves, whereby the reactions may advantageously be carried out in a solid bed.

Excessively high sulfur dioxide pressures and excessively low temperatures can lead to an undesirable, yet reversible, formation of sulfur. Diethyl ether and ethanol can result as by-products, which, charged with sulfur dioxide and iodine-containing compounds, may be reused, since with hydrogen iodide they equally form ethane and iodine in equilibrium reactions. Advantageously, the concentration of the sulfuric acid obtained in accordance with equation 1 is about 50–85%. The decomposition of sulfuric acid can proceed in the customary manner. It proceeds along the steps of concentration (up to 335° C), evaporation (335° C) and thermal or catalytic decomposition, e.g. in the presence of $V_2O_5$, of trioxide in $SO_2$ and oxygen at about 600°–950° C.

Any losses of ethylene can be covered in a simple manner, e.g. by the catalytic decomposition of ethane, which can be obtained in a known manner, e.g. by the reaction of methane at temperatures of more than 1000° C. Of course, ethylene losses can also be covered by cracking petroleum fractions, for example. Olefins other than ethylene, e.g. propylene or butylene, can also be converted with $SO_2$ and water to the corresponding saturated hydrocarbon and can be thermally or catalytically regenerated with hydrogen separation.

The novel circulation process encompasses fundamentally the following reaction diagram:

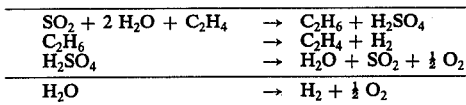

| $SO_2 + 2 H_2O + C_2H_4$ | $\rightarrow$ | $C_2H_6 + H_2SO_4$ |
| $C_2H_6$ | $\rightarrow$ | $C_2H_4 + H_2$ |
| $H_2SO_4$ | $\rightarrow$ | $H_2O + SO_2 + \frac{1}{2} O_2$ |
| $H_2O$ | $\rightarrow$ | $H_2 + \frac{1}{2} O_2$ |

In the drawing, one embodiment of the circulation process is illustrated in simplified form.

In Reactor I ethane and sulfuric acid (ca. 65%) are produced from ethylene, sulfur dioxide and water with the addition of iodine at about 275° C and about 120 atmospheres. The heat of the reaction is utilized for the production of current for the individual requirements of the installation. The sulfuric acid is removed by conduit 2 and is gradually relieved from pressure to 1 atmosphere and through conduit 2 introduced into apparatus II where it is cooled to about 165° C by the evaporation of water. The condensation heat of the water is utilized in heat exchanger X for the preheating of the charging substances. The separation of ethane from unreacted ethylene (not shown) may be carried out in hot, extensively thinned sulfuric acid, for example, with the formation of ethylsulfuric acid or in another known manner.

Higher olefins may equally be separated without difficulty because of their higher boiling point.

The ethane reaches reactor IV by way of conduit 3 and after the separation of the by-products by partial condensation at temperatures of down to about −60° C and subsequent washing of the prepurified ethane in apparatus III by way of conduit 4. The decomposition into ethylene and hydrogen takes place in reactor IV at about 700° C. The ethylene -hydrogen mixture is brought by way of conduit 5 into the separating plant, where the removal of the hydrogen takes place. From the separating plant V, the ethylene is returned to the reactor I by way of conduit 6. The sulfuric acid is sent to reactor VI by way of conduit 7 and concentrated there. The $SO_3$ formed there is conducted by way of conduit 8 to reactor VII where it is catalytically decomposed at about 800° C. The decomposition mixture is conducted by way of conduit 9 into the separating plant VIII from which the oxygen is drawn off. $SO_2$ and water are returned by way of conduit 10 to reactor I after heating in heat exchanger X. Reactors VI and VII are provided with interior returns for the recovery of the product heat (characterized by arrows). These reactors as well as reactor VI are heated by means of a secondary circuit 11, supplied to which in the heat exchangers XI and XII is the heat brought up from a high-temperature nuclear reactor IX over circuit 12.

I claim:

1. A process for the production of hydrogen and oxygen from water in a thermochemical, closed circulation process comprising:
   a. reacting sulfur dioxide, water and an olefin in the presence of catalytically active quantities of iodine in an exothermic reaction at temperatures of about 200°–350° C and pressures of about 20–300 atmospheres to produce sulfuric acid and a paraffin hydrocarbon corresponding to said olefin;
   b. decomposing the sulfuric acid at temperatures of about 600°–950° C into sulfur dioxide, water and oxygen;
   c. decomposing said paraffin hydrocarbon into hydrogen and the corresponding olefin at temperatures of about 500°–750° C;
   d. recycling into the exothermic reaction of step (a) the sulfur dioxide and water formed in step (b) and the olefin formed in step (c); and
   e. collecting and removing hydrogen and oxygen formed in steps (c) and (b), respectively.

2. The process of claim 1. wherein the amount of iodine is about 1–10 moles per 100 moles of olefin.

3. The process of claim 1 wherein said olefin is a member selected from the group consisting of ethylene, propylene and butylene.

4. The process of claim 1 wherein step (a) is conducted in the presence of a hydrogenation catalyst.

5. The process of claim 4 wherein the hydrogenation catalyst is a member selected from the group consisting of platinum asbestos, molecular sieves, palladium and nickel-containing compounds.

* * * * *